United States Patent [19]

Bergeron

[11] 4,192,051

[45] Mar. 11, 1980

[54] METHOD FOR MANUFACTURING FULLY SEALED PISTON RING

[76] Inventor: Alfred Bergeron, 1288 N. Bagley, Lot #6, Dallas, Tex. 75211

[21] Appl. No.: 855,206

[22] Filed: Nov. 28, 1977

Related U.S. Application Data

[63] Continuation-in-part of Ser. No. 674,887, Apr. 8, 1976, abandoned.

[51] Int. Cl.² .............................................. B23P 15/08
[52] U.S. Cl. ................................ 29/156.6; 29/156.63; 277/214; 277/220; 277/221
[58] Field of Search ......................... 29/156.63, 156.6; 277/220, 221, 222, 214, 216, 217, 193, 194, 195, 196, 197, 138, 75, 236, 143, 144, 145

[56] References Cited

U.S. PATENT DOCUMENTS

| | | | |
|---|---|---|---|
| 1,083,130 | 12/1913 | Patrick | 29/156.6 |
| 1,219,270 | 3/1917 | Dunham | 29/156.6 |
| 1,261,897 | 4/1918 | Bernard | 277/221 |
| 1,348,640 | 8/1920 | Hachmann | 29/156.6 |
| 1,357,392 | 11/1920 | Fuchs, Jr. | 29/156.63 |
| 1,386,997 | 8/1921 | Elliott | 29/156.63 |
| 1,395,366 | 11/1921 | Schreiber | 277/197 |
| 1,561,336 | 11/1925 | McGlenn | 29/156.63 |
| 1,581,312 | 4/1926 | Fryoux, Jr. et al. | 277/214 |
| 2,400,109 | 5/1946 | Ernst | 277/216 |

FOREIGN PATENT DOCUMENTS

| | | | |
|---|---|---|---|
| 279622 | 11/1930 | Italy | 277/214 |
| 275160 | 11/1927 | United Kingdom | 29/156.63 |

OTHER PUBLICATIONS

Super Seal, Piston Rings, "The Ring of Tomorrow—Today", by Super-Seal Piston Ring Manuf. Corp., Dallas Texas, 1952, pp. 8&9.

Sil-Fos and Easy-Flo Bulletin No. 12, 1941, by Handy and Harman, p. 2.

*Primary Examiner*—Daniel C. Crane
*Attorney, Agent, or Firm*—Charles W. McHugh

[57] ABSTRACT

For fabricating a compression piston ring, two identical split-ring members are formed, each having parallel planar side faces and a cylindrical outer edge face. For each ring member, circumferentially overlapping fingers are formed at the adjoining ends, one being an outer finger and one being an inner finger; and these fingers are provided with radially contiguous cylindrical faces, concentric with the outer edge face. The confronting side faces of the two ring members are preferably provided with a lap finish. The rings are assembled in side-by-side contiguous relation, with the outer finger ends thereof overlapping to some extent; and these overlapping ends are joined by means of at least one silver solder joint which is located adjacent to the outer fingers, so that these outer fingers are protected by the adjacent ring member. For fabricating a fully sealed compression-oil ring combination, a first compression ring member is fabricated as described above; and a second oil ring member is fabricated having a first compression flange, a second flange, and an interconnecting web having transverse ports between the two flanges. Circumferentially overlapping fingers are not necessary on this second ring member as they were with the first ring member, but they may be provided. The compression flange is provided with a top planar face and an outer cylindrical edge face, with this flange being joined to the first compression ring member by means of a localized silver solder joint. The outer edge face of the second flange is finished to a smaller diameter than the outer edge face of the compression flange, in order to provide a clearance space between the second flange and the cylinder wall.

2 Claims, 8 Drawing Figures

U.S. Patent     Mar. 11, 1980     4,192,051

METHOD FOR MANUFACTURING FULLY SEALED PISTON RING

REFERENCE TO RELATED APPLICATION

This application is a continuation-in-part of my co-pending application Ser. No. 674,887 filed Apr. 8, 1976, now abandoned.

The invention relates to a method for manufacturing a fully sealed piston ring, such as a fully sealed compression ring which is described in the previously co-pending application Ser. No. 66,991 filed Aug. 26, 1970 entitled, "Piston Ring Structure", now U.S. Pat. No. 3,949,997 issued Apr. 13, 1976.

BACKGROUND AND SUMMARY OF THE INVENTION

This invention relates generally to a method for manufacturing a fully sealed piston ring structure adapted for use in high pressure engines and pumps; more particularly, it relates to a method of joining piston ring components using silver solder which melts at a temperature which is low enough to avoid ring distortion.

The design of conventional piston rings which are used in internal combustion engines for automobiles, trucks, buses, and for industrial purposes, is a significant contributor to the pollution of the air resulting from the emissions of these engines, whether such reciprocating piston internal combustion engines are fueled by gasoline or diesel fuel. A conventional piston ring is understood to mean a single ring for a piston ring groove having some form of butt joint. Such piston rings which have a straight or butt joint where the two ends of the split ring come together are characterized by the problem of "blowby" or leakage of gases past the ring. What is referred to as "blowby" past the piston rings causes an increase in the exhaust emissions for the following reasons: blowby results in the reduction of compression above the piston and therefore less efficient engine operation; and, less efficient engine operation means that more fuel is required for a given power output, therefore more exhaust emissions. Also, conventional piston ring design requires greater clearance between the piston rings and piston groove walls, which inherently increases leakage around the piston rings. Furthermore, blowby results in contamination of the air/fuel mixture with oil and vapors from the crankcase, thereby increasing undesirable exhaust emissions.

While many designs of fully sealed rings have been proposed to solve the problems mentioned above, one difficulty is that the cost of manufacture of such rings has seemed to be economically unreasonable in relation to the cost of manufacture of conventional piston rings. The prior art teaches piston ring configurations consisting of two split ring members which are welded together to form a two-turn helical ring of the type described herein, and it also teaches integrally formed two-turn helical rings; but the prior art does not disclose how such rings may be manufactured or fabricated as a practical matter. The applicant is not aware of any practical method for welding together two ring members which are fabricated of piston ring alloy, which does not distort or deface the ring members or the ring combination severely. Typically, significant further finishing is required to true up the various faces of a welded ring. Too, in the case of spot welding, the structure of the ring metal would be weakened to such an extent as to contribute to premature breakage in use.

Another situation in which engines may experience unreasonable blowby past the piston rings arises from deformation of the cylinder walls, which may result from unequal expansion caused by non-uniform thickness of the cylinder wall casting or non-uniform heating of the cylinder wall. However, the resultant blowby from such a situation could be reduced if there could be a piston ring which is more flexible than conventional rings, and which is better able to follow such deformations of the cylinder wall.

One problem with conventional rings which have a butt joint is that hot gases flow through the joint—into and out of the groove space behind the ring, resulting in carbon buildup at the joint. This carbon buildup could be so severe that it might freeze the ring joint, unless some means is provided for breaking up the deposited carbon. A solution has usually been to provide sufficient clearance (or slop) between the ring and groove walls so as to allow axial movement of the ring joints relative to the groove; this clearance may be in range of 0.0025 to 0.0030 inches for the top groove of the piston, and about 0.0020 inches for the second and third compression ring grooves. As might be expected, providing this clearance inherently increases the blowby problem. It should be understood, therefore, that there has been a long-standing need for improved piston rings which can minimize or eliminate the problem of blowby.

A principal object of this invention is to provide a method for manufacturing a fully sealed piston ring which substantially prevents blowby past the piston ring while still being economical to manufacture.

Another object of this invention is to provide a method for manufacturing a fully sealed piston ring which is suitable for use with engines having ported cylinders as well as with engines having non-ported cylinders.

A further object of this invention is to provide a method for manufacturing a fully sealed piston ring which, in addition to substantially preventing blowby between the ring's ends (or between the ring and the piston groove), is more flexible so as to better follow cylinder irregularities or deformations—to thereby minimize blowby resulting from such irregularities or deformations.

Still another object of this invention is to provide a method for manufacturing a fully sealed piston ring, enabling the design of less clearances between the piston ring and the piston groove, and providing for less wear and longer life of these co-acting surfaces.

A still further object of this invention is to provide a method for manufacturing a fully sealed piston ring, including the joining of two split-ring members by a metal joining operation which neither damages, distorts nor defaces the ring members.

Still another object of this invention is to provide a method for economically manufacturing a fully sealed piston ring, i.e., a ring which substantially eliminates both axial blowby across the ring and radial blowby across the ring from the outer piston wall to the base of the piston ring groove.

These objects are accomplished in a method for fabricating a unitary, fully sealed piston ring including the following steps. First and second split ring members are formed with parallel and confronting planar side faces, and with concentric outer and inner faces, with at least the outer edge face being cylindrical. In each ring member there are formed circumferentially overlapping, radially contiguous fingers at the adjoining ends of the ring. These fingers include a radially outer finger consisting of a circumferential extension of the outer peripheral portion of the ring member, and a radially inner finger consisting of a circumferential extension of the radially inner portion of the ring member. Typical fingers are about one-fourth inch in length. Radially contiguous and confronting faces which are cylindrical in nature are formed on these figures, with the faces being generated about the same axis as the outer cylinder face. The cylindrical finger faces and the side faces of the ring members are finished for sealing relation with respective co-acting surfaces. The first and second ring members are assembled in overlying, side-by-side, contiguous relation, with the first ends of the ring members circumferentially overlapping each other by a distance that preferably is at least one-half inch. With this arrangement, the joint which is made up between the first and second ends of a given ring member will overlie a solid (uninterrupted) portion of the other ring member. The two ring members are permanently joined into a unitary assembly by means of at least one silver solder joint between the overlapping and contiguous first ends of the members, with the joint preferably being located adjacent each of the outer fingers, so as to secure each of the outer fingers rigidly to the adjacent ring member. If the ring members are suitably finished before the joining step, and a suitable silver solder joining material is used, there should be no need for any subsequent finishing steps before the outer cylindrical surfaces of the assembled ring members are ready for a sealing relation with a co-acting cylinder wall.

The novel features and the advantages of the invention, as well as additional objects thereof, will be understood more fully from the following description when read in connection with the accompanying drawing.

DRAWING

DESCRIPTION OF THE PREFERRED EMBODIMENTS

The compression rings which are manufactured according to the method of the invention are an integral assembly of two split-ring members. To promote economy in manufacture, the two ring members may be identical to each other, although one of the rings will usually be inverted before it is joined to the other. The method is also applicable to the manufacture of a combination compression/oil ring where the two ring members are not identical.

Figure 5:
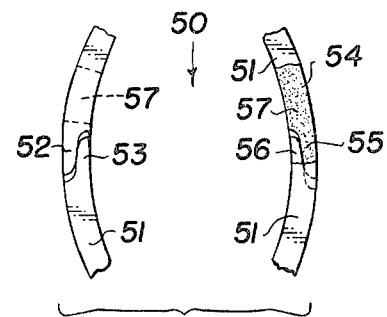
FIG. 5 is a fragmentary view of an alternative form of a compression ring having two widely separated silver solder joints between the two ring members.
Figure 6:
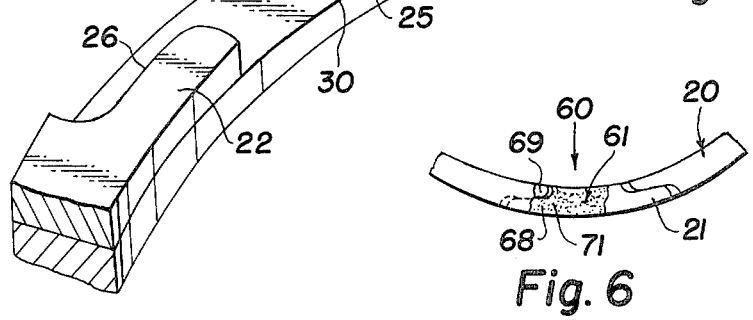
FIG. 6 is a fragmentary plan view of a compression/oil ring combination manufactured according to the invention.
Figure 7:
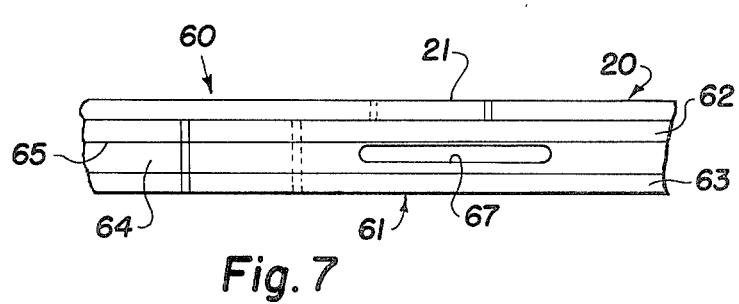
FIG. 7 is a fragmentary edge or elevation view of the compression/oil ring of FIG. 6.
Figure 8:
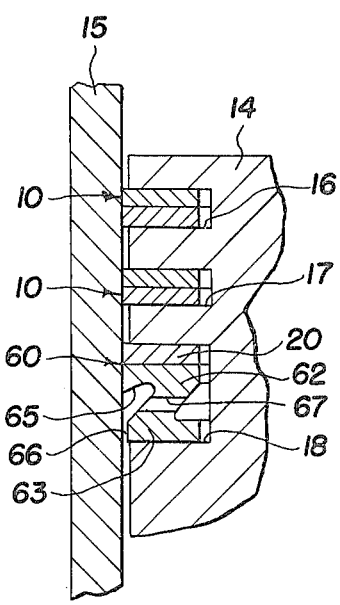
FIG. 8 is a fragmentary cross-sectional view, taken in a radial plane, of the combination of a piston and cylinder wall, and including both the compression ring of FIG. 1 and the compression/oil ring of FIG. 6.

FIGS. 1 through 4 of the drawing illustrate a compression ring for pistons wherein the ring members are joined together by a single silver solder joint; and FIG. 5 illustrates a similar compression ring where the ring members are joined together by two silver solder joints. FIGS. 6 and 7 illustrate a piston compression/oil ring combination wherein the ring members are preferably joined together by means of a single silver solder joint in the same manner as the ring of FIG. 1. FIG. 8 illustrates an assembly of a piston 14, cylinder wall 15, two compression rings 10 in piston grooves 16 and 17, and a compression/oil ring 60 in piston groove 18.

Method of Manufacturing Embodiments of FIGS. 1 Through 5

FIGS. 1 through 4 illustrate a compression ring 10 for pistons and the like which is made up of two identical ring members 20 and 30, each member being rectangular in cross-section and having parallel planar side faces as well as cylindrical and concentric inner and outer edge faces. These ring members are preferably cast from conventional piston ring materials which are known as "piston ring alloys". Such alloys usually have a melting point in excess of 2000 degrees F.

In the manufacturing process, the first step after casting which may be accomplished promptly after the rings leave the foundry is the finishing of the side faces, including a first rough finishing (which may be accomplished by means of a double disk grinder) to a thickness of, for example, about 0.001 inch oversize with respect to final thickness. Then, a final lap finish to the final thickness will produce a ring member with excellent surfaces at a modest cost.

Next, the ring blanks are split in a radial direction and some of the "insert" (or extra material that is deliberately cast into the blank) is removed and discarded. Unlike conventional piston rings, however, the full length of the "insert" is not cut out of the blanks, because the overlap of the fingers that are subsequently machined into the ends serve to negate the effect of some of the insert length. If the fingers are to have a length of about 0.25 inch, then that same 0.25 inch should be subtracted from the insert length which is to be cut out of the blank. Thus, a partially finished blank according to this invention will be longer than a corresponding partially finished blank according to the prior art—by the length of the individual fingers which are provided at adjacent ends of the finished ring.

The next steps will be the boring of the ring members for the final inner diameter, and the turning of the ring members for the rough outer diameter—leaving a small amount of material for the outer diameter finishing. For these operations, the ring members 20, 30 should be radially compressed to approximately their ultimate use diameter, so that these machined ID and OD diameters will be concentric with the piston diameter after assembly. Keeping in mind that there is an excess of circumferential length in the blanks—to the extent of an anticipated finger length, the two ends must be temporarily overlapped for these machining operations.

Figure 3:
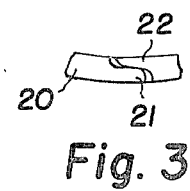
FIG. 3 is a fragmentary plan view showing a ring joint closed, as it would be when the ring is compressed in a piston/cylinder assembly.
Figure 2:
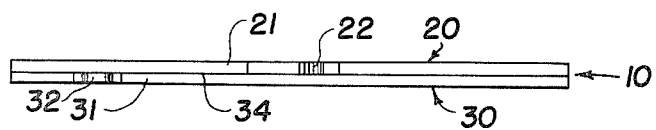
FIG. 2 is an edge or elevation of the compression piston ring of FIG. 1.
Figure 4:
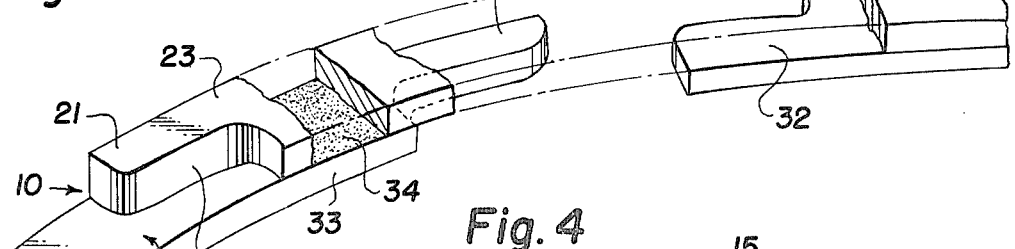
FIG. 4 is a fragmentary perspective view, partially broken away, of the piston compression ring of FIG. 1, particularly illustrating the location of the single silver solder joint for this ring.

The next step is the forming of the fingers which will eventually create the joint for each of the ring members 20 and 30. That is, a "joint" as used in this sense is formed by forcing together two circumferentially overlapping and radially contiguous fingers which have the same thickness as the ring proper. The configuration of these fingers is perhaps best seen in FIG. 4. For the top ring member 20, one end 23 is provided with a radially outer finger 21 which is a circumferential extension of the outer portion and outer edge face; and the other end is provided with a radially inner finger 22 which is an extension of the inner edge portion and edge face of the ring member. These fingers 21, 22 may be advantageously cut with a high speed milling cutter using a pantograph or tracer apparatus to assure precision. The outer and inner fingers 21, 22 are provided with radially confronting cylindrical faces 25 and 26, generated about the same center as the outer edge face, and which will be in contiguous sealing relation (as seen in FIG. 3) when the ring member 20 is compressed in a piston cylinder assembly, as illustrated in FIG. 8. The lower ring member 30 is provided with outer and inner fingers 31, 32 in the same manner as ring member 20.

For the embodiment of FIGS. 1 through 4 the ring members 20 and 30 are joined together by means of a single silver solder joint 34, to provide a form of helical ring having two full turns (i.e., 720 degrees). For forming this soldered joint 34, one of the ring members is oriented so that its outer finger (e.g., finger 21) is pointing to the left or counterclockwise, and the other ring member is inverted so that its outer finger 31 is pointing to the right (clockwise). The ends 23, 33 of the ring members 20, 30 are then overlapped circumferentially so that a sound silver solder joint can be established between the members 20, 30 in a region that lies physically between the fingers 21, 31. This may be accomplished by rotating the two members 20, 30 with respect to each other about their common axis until there is a circumferential length of about ¼ inch of ring body between the two ends 23, 33. If the fingers 21, 31 are about ¼ inch in length, then the total overlap between the members 20, 30 at this region will be about ¾ inch. (The additional coincidence or overlap of the ring members 20, 30 at regions remote from the joint 34 are, of course, not pertinent to this particular discussion.)

The silver solder to be used in achieving the joint 34 is preferably an alloy having a melting point within the range of about 700 degrees F. to 1100 degrees F. The lower end of the range of preferred soldering temperatures is established primarily to have at least a 200 degree differential between the highest contemplated operating temperature that may occur in an internal combustion engine (i.e., about 500 degrees F.) and the melting point of the silver solder (i.e., 700 degrees F.). The higher end of the range of preferred soldering temperatures is established so that the base metal of the ring members 20, 30 will not be weakened or deleteriously effected by bringing the silver solder momentarily to the temperature at which it becomes a liquid—so that it will wet the ring members 20, 30.

For convenience the silver solder material may be inserted between the ring members 20, 30 in the form of a small square of sheet silver solder, about 0.002 inch thick and about 0.010 square inch in size. With the small sheet of silver solder positioned axially between the ring members 20, 30 and circumferentially between the ends 23, 33, the ring members are clamped in a manner so as to maintain a light clamping pressure in the region of the joint 34 during the subsequent heating step. The clamping pressure should not be so severe as to drive out all of the molten silver solder, however; and an ultimate separation of about 0.0002 inch between the joined ring members 20, 30 is advantageous. This very small ultimate separation will permit a small film of oil to exist between the ring members 20, 30 when they are in use in an internal combustion engine.

Actual completion of the soldered joint 34 is preferably effected electrically by use of induction heating, so as to carefully control the application of heat to a limited area adjacent the joint 34. Also, induction heating typically permits very careful control over the heating temperature, which should be just sufficient to convert the silver solder to its free-flowing condition. When the silver solder becomes molten, it will tend to flow almost like water; and it sometimes tends to move circumferentially outward toward each of the two fingers 21, 31. If this happens, it will not cause a problem, especially when there is only a relatively small amount of silver solder involved. However, if it is desired to initially provide a greater amount of silver solder, then the ring members 20, 30 should probably be inclined (with the "joint" region being lowest) so that any molten solder which flows out of the clamped joint 34 will pass to the outer face of the ring 10 rather than its inner face. Later, a "final finish" to the outer diameter of the ring 10 (if provided) will inherently remove any small amount of silver solder which may be present. Inclining the ring members 20, 30 by as much as about 15 degrees with respect to horizontal will usually be sufficient to insure that any excess silver solder will flow to the outside. Having a relatively small angle of about 15 degrees will usually be better than a substantially steeper angle, because the molten silver solder will tend to remain spread out along the circumference rather than being concentrated in such a way as to form a droplet.

An important advantage of the method described herein is that the compression ring 10 is complete and ready for installation on a piston immediately following the step of joining the two members 20, 30. This is because the two ring members 20, 30 are not carried to a temperature that is high enough to deface, warp or otherwise distort the previously machined members. And, since there need be no fusion between the base metals of the ring members 20, 30 (or other heating which might justify a subsequent heat treatment), no further processing is absolutely required. Of course, a final step of finish grinding on the OD may optionally be provided, but it is normally not required if the amount of silver solder material is kept modest.

The ring 10 fabricated by this method has certain important feures. The gaps between respective ends of the two ring members 20, 30 are circumferentially spaced, with each gap or "joint" being axially adjacent a body portion of the other ring member. And, in compressed relation within a cylinder, the mating faces of the overlapping fingers will provide a radial seal. The lapped and juxtaposed faces of the two ring members 20, 30 are separated only by the very thin silver solder joint at one point; and oil in the engine will insure that an oil film will be maintained between the juxtaposed faces. Because of this contiguous relation between the members 20, 30, there can be no radial blowby across the ring; and, with the lapped side faces, the ring 10 can be dimensioned for a very close fit within the piston groove. With a two-turn piston ring 10 joined by a single silver solder joint 34 and having a total thickness to replace a single conventional piston ring, the two turns of the ring function independently of each other to bear outwardly against the cylinder walls; and two thin turns are more flexible than a conventional single ring. But, while the two members 20, 30 are more flexible, the silver solder joint 34 is immediately adjacent the radially outer fingers 21, 31; hence these fingers are fully protected and anchored by a body portion of the adjacent ring member. And, the inner fingers 22, 32 are retained and protected by their associated outer fingers.

FIG. 5 illustrates a slightly different form of compression ring 50, consisting of individual ring members 51, 54 which are identical in their manufacture to the above-described ring members 20, 30. A main difference in the assembly operation is that the ring members 51, 54 are rotated about 180 degrees in comparison with the members 20, 30 shown in FIG. 1. Thus, the ends of the ring members carrying the respective outer fingers 52, 55 are spaced approximately 180 degrees apart; and the ring members are joined by two silver solder joints 57, 58 which are preferably positioned adjacent the respective outer fingers 52, 55. One main difference in the method of manufacture of ring 50 is the step of effecting two silver solder joints instead of one. A ring 50 fabricated in this manner is less flexible than the previously described ring, because that circumferential portion of the joined members 51, 54 between the two outer fingers 52, 55 effectively becomes a unitary (essentially solid) piece; and significant radial flexing of an individual member 51 or 54 is only possible along the length between an inner finger 53, 56 and the first joint encountered in a direction toward its other end. Because the ring members 51, 54 no longer have any relative sliding movement with respect to each other (in a circumferential direction) between the two joints 57, 58, the ring members should be compressed to near their "ultimate use" or final diameter at the time that the two joints 57, 58 are established by soldering or the like. Thereafter, the "cantilevered" portions of the ring members 51, 54 (out to the fingers 53, 56) are free to flex and expand independently, while the captured or "set" portions of the ring members will have a rigidity typical of prior art piston rings. Otherwise, the ring 50 has the same characteristics, including the property that the radially outer fingers 52, 55 are fully shielded or protected by the adjacent ring member, and that the radially inner fingers 53, 56 are protected and retained by the respective outer fingers.

Figure 1:
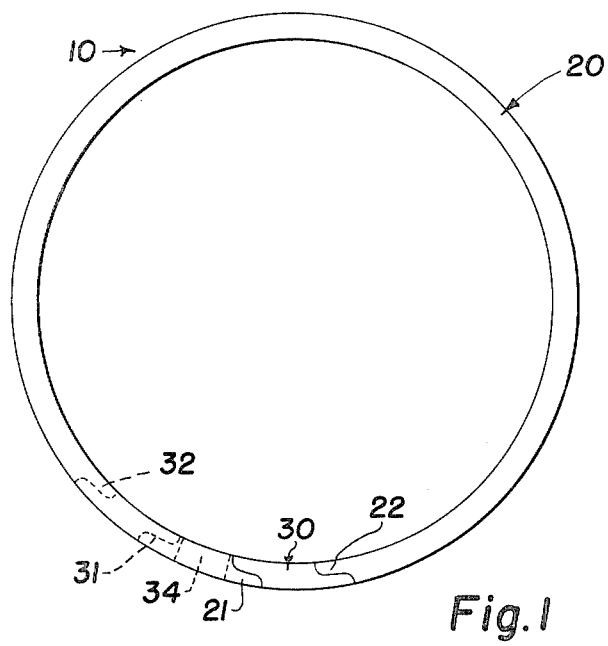
FIG. 1 is a plan view of a piston compression ring manufactured according to the method of the invention, prior to compression to final diameter in a piston/cylinder assembly.

In one sense, the embodiment of FIG. 1 may be described as the extreme case of an embodiment like that of FIG. 5, wherein the two jonts 57, 58 are brought closer and closer together until they eventually overlap. If the relative positions of the two joints 57, 58 are moved progressively together from a 180 degrees displacement to essentially a 0 degree displacement, the free or "cantilevered" portions of the ring members will correspondingly increase in length, and the need for compressing the ring members during the soldering step is progressively reduced. Using this rationale, a designer can calculate about how much flexibility as he wishes to have in the piston ring—and position the soldered joints accordingly. To the extent that the joints 57, 58 are separated at all, those contiguous portions of the ring members which lie interiorly between the two joints are locked together. Of course, it would be possible to use on long solder joint instead of two small and separated joints; but the amount of required solder material would thereby be increased without any real beneficial effect on ring performance. To the extent that it is desired to use a plurality of solder joints on a relatively large piston ring, e.g., a ring having a diameter in excess of about 4 inches, it may be useful to add a supplemental solder joint between two widely separated joints. Such a supplemental interior joint will not have any effect on relative movement between the two ring members, because they are already locked together by the two remote joints; but a supplemental joint would naturally add some back-up "security" to the ring, in the event that one of the other solder joints should perhaps fail.

Advantages of Embodiments of FIGS. 1 Through 5

The advantages of the rings 10 and 50 manufactured as described above are as follows:

(1) The made-up joints between ends of the respective ring members are circumferentially spaced, so that the joint of one ring member is blocked or "sealed" by the body of the adjacent ring member. This prevents direct axial blowby through the joint.

(2) The sealing provided by the radially contiguous cylindrical surfaces of the overlapping fingers prevents radial blowby across a ring member joint.

(3) The providing of the lapped side faces and the contiguous relation of the ring members prevents radial blowby between the ring members.

(4) Since a ring manufactured by the method of the invention has the same thickness as a conventional ring which it will replace, but is made up of two ring members each having one-half that thickness, the ring members will be more flexible—and will tend to more readily follow any deflections in the cylinder wall. For the ring 10 particularly, where the two ring members 20, 30 are joined at one localized spot, the ring members expand freely and relatively independently of each other against the cylinder wall. And, of course, independent expansion is promoted by the oil film between the contiguous ring members.

(5) Since there can be no radial blowby across the ring, the problem of carbon buildup in the ring joints is eliminated; and thereis no necessity to provide excessive clearance between rings and the walls of the piston groove. Accordingly, the clearance between a ring manufactured according to the invention and its associated groove may be in the range of 0.0010 to 0.0015 inch (which is about one-half of that required for a conventional piston ring).

(6) An ultimate advantage (resulting from other enumerated advantages) is that the compression in a cylinder can be maintained at a higher value. Additionally, the achieved compression will be maintained for a long period of time, because there will be less wear of the rings and of the piston grooves. Of course, a lap finish provided on the ring side faces will be beneficial in this regard.

(7) From the standpoint of the method, per se, an ultimate advantage is that a ring having the above-enumerated features can be manufactured at a reasonable cost.

(8) A further advantage in use is that the rings can be used in ported cylinders; and the rings are inherently designed to prevent any interference with the cylinder wall port which may result in breakage of the rings.

(9) The assembly method enables the joining of two ring members in a metal joining technique which in no way weakens either of the ring members or the assembly, and which eliminates the requirement of high heat necessary for fusion joining (which would likely distort the individual ring members or the assembly). And, further finishing of the ring assembly after joining has been accomplished is optional. With this method the only step following the joining of the two ring members is the final finishing of the true outer edge surface—to assure perfect sealing of the final assembly with the cylinder wall.

Method of Manufacturing Embodiment of FIGS. 6 and 7

FIGS. 6 and 7, along with FIG. 8, illustrate a combination compression/oil piston ring 60 fabricated according to the method of the invention. This ring 60 is made up of a ring member 20 (fabricated as described above) and a ring member 61 which performs the oil-control function. The ring member 61 is preferably cast from a piston ring alloy, and is formed to a Z-shaped cross-section, having an upper compression flange 62, a lower oil flange 63, and an inclined web 64 connecting the inner edge of the compression flange and the outer edge of the base flange.

The inner and outer edge faces of the ring member 61, particularly at the compression flange, are dimensioned to correspond with the ring member 20; and outer and inner fingers 68, 69 (FIG. 6) are milled in a manner similar to that previously described, to provide radially contiguous sealing faces which function only for the compression flange 62. Oil flow ports 67 are provided in the web 64 to permit flow of oil to the base of the piston groove. A lip 65 is advantageously formed adjacent to the outer edge face of compression flange 62 to define an oil wiping lip.

The two members 20, 61 are preferably joined in a manner similar to the joining of the ring 10, with the gaps between ring ends being offset by a distance sufficient to provide an overlap of body portions which is sufficient to promote a sound joint 71 with silver-alloy brazing material. This rigid connection or joint 71 is preferably completed in the manner described for the ring 10, with localized heating by induction means being accomplished in a matter of a few seconds. The final finishing of the outer edge sealing face for the ring 60 may then be accomplished, preferably by grinding, for a good seal with the cylinder wall. This sealing face includes, of course, the outer faces of the ring member 20 and the compression flange 62.

Another step, which may be accomplished last, is the finishing of the outer edge face 66 of the oil flange 63. This flange 63 is finished to a slightly smaller diameter than the compression flange 62, to provide a clearance of about 0.025 inch between this oil flange face and the cylinder wall when the ring assembly 60 is installed.

Advantages of the Embodiment of FIGS. 6 and 7

The advantages of this combination compression/oil ring 60, and of its method of manufacture, include most of the advantages listed for the previously described compression rings 10 and 50. An additional advantage is the provision of a simple and reliable method of manufacturing a ring which performs the functions of both a compression ring and an oil ring, and which can be used with ported cylinders without great risk of breakage of the ring through interference with cylinder wall ports and the like.

While only a few preferred embodiments of the invention have been described in great detail herein, it will be understood by those skilled in the art that changes and modifications may be resorted to without departing from the spirit and scope of the invention.

What is claimed is:

1. A method for fabricating a unitary, fully sealed piston ring including the steps of:
    (a) forming first and second split ring members with each having parallel planar side faces and generally concentric outer and inner edge faces, with said outer edge face being cylindrical when a split ring member is compressed to its intended final diameter, and each of said split ring members being formed from an annular blank whose initial circumference is greater than the intended final circumference of the piston ring by a length identifiable as the insert length, and each of said ring members being split in a generally radial direction to form first and second ends;
    (b) forming circumferentially overlapping, radially contiguous fingers at the ends of said split ring members, including a radially outer finger whose exterior face constitutes a circumferential extension of the outer edge face of a split ring member, and including a radially inner finger whose interior face constitutes a circumferential extension of the radially inner face of a split ring member, with said fingers having a length less than the insert length of said blank;
    (c) finishing said finger faces and said outer and inner edge faces of the ring members for sealing relation with their respective co-acting surfaces;
    (d) positioning said first and second split ring members in overlying, side-by-side and contiguous relation, with the respective first ends of each of said split ring members circumferentially overlapping a body portion of the other ring member, whereby a joint is made up between the first and second ends of each split ring member when the ring member is compressed to its final diameter, and said made-up joint for each ring member overlies a body portion of the adjacent ring member, and the first and second ring members being oriented in a generally horizontal position so as to form an angle of no more than fifteen degrees with respect to horizontal at the time that joining is accomplished; and
    (e) permanently joining said two ring members into a unitary assembly by means of only a single and localized silver solder joint between confronting side faces of the two ring members, each confronting side face having a flat surface with the entire surface extending only in a single plane and said solder being disposed between the flat surfaces, with the two ring members being positioned so that the silver solder joint is in close proximity to each of the two radially outer fingers, and the joining step being accomplished after the recited finishing step, and the amount of joining material being sufficiently small as to obviate any further finishing after the joining step, whereby the ring is ready for use immediately after the joining step.

2. A method for fabricating a unitary, fully sealed piston ring including the steps of:
    (a) forming first and second split ring members with each having parallel planar side faces and generally concentric outer and inner edge faces, with said outer edge face being cylindrical when a split ring member is compressed to its intended final diameter, and each of said split ring members being formed from an annular blank whose initial circumference is greater than the intended final circumference of the piston ring by a length identifiable as the insert length, and each of said ring members being split in a generally radial direction to form two ends with one of the two split ring members having a Z-shaped cross-section as examined in a radial direction, with said Z-shaped member including an upper compression flange and a lower oil flange, and wherein the final diameter of the outer face of said oil flange is finished to a slightly smaller diameter than the outer edge face of said compression flange;

(b) forming circumferentially overlapping, radially contiguous fingers at the ends of said split ring members thereby forming first and second ends on each of said split ring members, including a radially outer finger whose exterior face constitutes a circumferential extension of the outer edge face of a split ring member, and including a radially inner finger whose interior face constitutes a circumferential extension of the radially inner face of a split ring member, with said fingers having a length less than the insert length of said blank;

(c) finishing said finger faces and said outer and inner edge faces of the ring members for sealing relation with their respective co-acting surfaces;

(d) positioning said first and second split ring members in overlying, side-by-side and contiguous relation, with the respective first ends of each of said split ring members circumferentially overlapping a body portion of the other ring member, whereby a joint is made up between the first and second ends of each split ring member when the ring member is compressed to its final diameter, and said made-up joint for each ring member overlies a body portion of the adjacent ring member; and (e) permanently joining said two ring members into a unitary assembly by means of at least one localized silver solder joint between confronting side faces of the two ring members, with the melting point of the silver solder being at least 200 degrees higher than the highest contemplated operating temperature for said piston ring.

* * * * *